Patented July 21, 1942

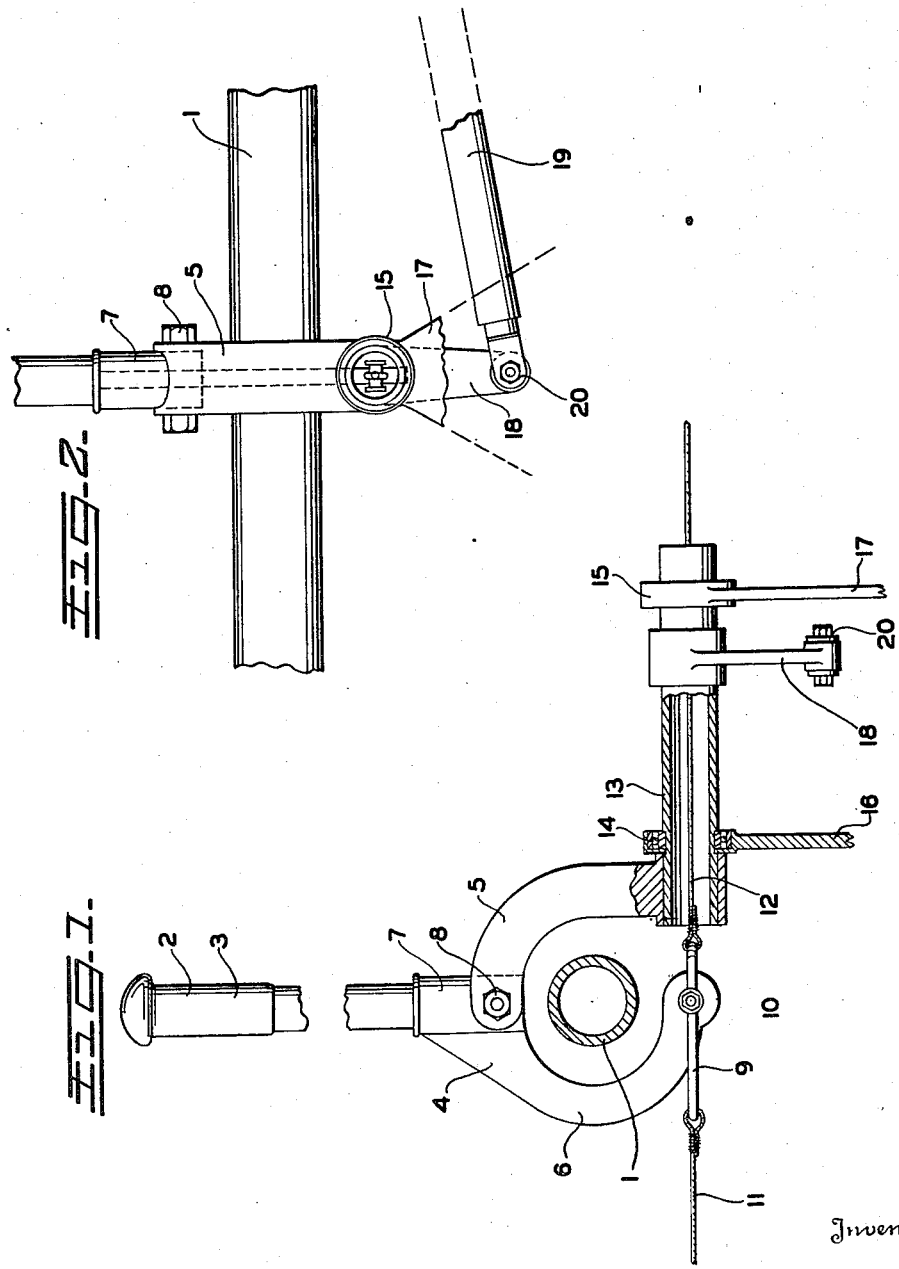

2,290,224

UNITED STATES PATENT OFFICE 2,290,224

CONTROL MEANS FOR AIRPLANES

Herbert L. Bowers and Robert A. Wolf, Kenmore, N. Y., assignors to Bell Aircraft Corporation, Buffalo, N. Y., a corporation of New York Application December 30, 1938, Serial No. 248,639

3 Claims. (Cl. 244—83)

Our invention relates generally to control columns for an airplane, and more especially to a column designed for use in an airplane in which the normal position for the control column is located at a point between the power plant and the propeller in such a position that the power shaft would normally pass through the plane of the control column and intersect the column.

It is apparent that in this type of airplane construction, the problem is to provide a control column that can be freely operated without contacting the power shaft.

An object of our invention is to provide a control column, for the type of airplane described, which is so constructed that it may be freely operated when mounted in its normal position.

A further object of our invention is to provide a control column which is simple in construction and efficient in operation and which may be used in any type of airplane construction.

With these and other objects in view, our invention embraces the concept of providing a control column, the lower portion of which is so constructed that it is capable of a free universal movement without the possibility of coming in contact with a power shaft which passes through the same plane as its lower section.

While a control column of this construction is especially suitable for airplanes which are designed in such a manner that the control column in its normal location will be positioned between the power unit and the propeller, the control column which forms the basis of this invention may be used in any type of airplane design.

In the drawing:

Figure 1 is a front view in elevation of the control column, partly broken away, and its associated mechanism.

Figure 2 is a side view in elevation of the device shown in Figure 1.

In Figure 1 there is shown a power shaft 1 which passes through our novel control column, designated generally by the numeral 2. This column 2 is comprised of a grip member 3, a base member 4, and a bracket member 5 which partly encircles the power shaft 1 in such a manner that it does not come in contact with the shaft when the control column is operated.

The lower portion of the base member 4 is a curved extension, in the form of a goose neck 6, which circles the power shaft 1 on the side opposite to the bracket 5 and is also positioned in such a manner that it cannot come in contact with the shaft when the control column is operated. On the upper extremity of the goose neck 6 is provided a socket 7 in which is rigidly mounted the grip member 3. The base 4 is pivotally mounted on the upper extremity of the bracket 5 by a nut and bolt arrangement or other suitable means which pass through aligned apertures in the socket 7 and the bracket 5 as shown at 8.

The lower extremity of the goose neck 6 is attached to a shackle 9 by means of a nut and bolt arrangement which is carried by a suitable aperture in the goose neck 6 as shown at 10. The shackle 9 is attached to aileron control cables 11 and 12 by means of which the control column is connected to the ailerons of the airplane.

The bracket 5 is rigidly mounted on a torque tube 13. This tube 13 is journalled in bearings 14 and 15 which are carried by supports 16 and 17, respectively, which are attached to the fuselage structure of the airplane in any suitable manner. The aileron cable 12 passes through the tube 13.

Rigidly mounted on the torque tube 13 between the bearings 14 and 15 is a crank 18. The lower extremity of this crank 18 is attached to a push-pull rod 19 of an elevator control by a pivotal connection, such as shown at 20.

In operation, a transverse movement of the grip member 3 will cause a pivotal movement of the base member 4 on the bolt 8. This movement of the base 4 causes a tension to be exerted on either the aileron cable 11 or 12 which results in the raising of one aileron of the airplane and the lowering of the other.

If, on the other hand, the grip member is moved in a fore or aft direction, the connecting means 8 will force the bracket 5 to follow the socket 7, thereby causing the bracket 5 to impart a rotative movement to the torque tube 13 upon its bearings 14 and 15. The movement of the torque tube 13 causes a movement of the crank 18, which transmits a corresponding lineal motion in the push-pull rod 19. This results in a lowering or raising of the elevators of the airplane.

If desired, the positions of both the aileron surfaces and the elevators may be affected at the same time. This is accomplished by imparting simultaneously both a fore and aft and a transverse motion to the control mechanism by the proper operation of the grip member 3.

It is believed apparent from the above description that we have provided a control column, which, although not limited to any particular type of airplane, is especially adaptable for use in an airplane in which the drive shaft passes through the plane ordinarily occupied by the control column mechanism. Airplanes are often designed in this manner because of the desirability of placing the power unit in the center of gravity of the airplane so as to increase the maneuverability. After the proper location for the power plant has been determined, the power shaft is extended through the fuselage construction in either direction depending upon whether the airplane is to be of the tractor or pusher type. In this type of airplane, the control column described may be used in its normal position without the danger of it coming in contact with the power shaft.

Besides the advantages outlined above, the control column which forms the basis of this invention is efficient in operation, economical in construction, and is readily assembled.

While for purposes of illustration we have described one form of our invention and have shown it in connection with a power shaft which passes through the place normally occupied by the control column, it is obvious that this control column may be used in any type of airplane construction. Moreover, various changes may be made in the specific construction and various mechanical equivalents used without departing from the spirit of this invention. We, therefore, wish this invention only to be limited by the prior art and the scope of the appended claims.

We claim:

1. In an airplane having aileron and elevator control surfaces, a control column composed of a base member in the form of a goose neck upon which is mounted a grip member, a rotatable shaft, a bracket member and a crank rigidly mounted on said rotatable shaft, said base member being pivotally mounted on the bracket member and being operatively attached to the aileron surfaces of the airplane and said crank being operatively connected to the elevator surfaces of the said airplane.

2. In an airplane having aileron and elevator control surfaces, a control member comprising a hollow rotatable shaft, a bracket member and a crank rigidly mounted on said shaft, a curved base member, said base member being pivotally mounted at one extremity on the bracket member, a grip member mounted on said base adjacent said pivotal mounting, a pair of links connecting the opposite extremity of the base member to the aileron control surfaces, one of said links passing through the said shaft, and a third link connecting the said crank to the elevator surfaces of the said airplane.

3. In an airplane having aileron and elevator control surfaces, a control column comprising a rotatable shaft, a bracket member and a crank rigidly mounted on said rotatable shaft, a curved member, said curved member being pivotally mounted at one extremity on the bracket member, a grip member extending upwardly from said curved member at a place adjacent the pivotal mounting, means connecting the curved member to one set of the said control surfaces of the said airplane, and means connecting the said crank to the remaining set of control surfaces of the airplane.

HERBERT L. BOWERS.
ROBERT A. WOLF.